United States Patent [19]

Bourdages et al.

[11] Patent Number: 4,989,115

[45] Date of Patent: Jan. 29, 1991

[54] SURGE ARRESTER

[75] Inventors: Michel Bourdages, Boucherville; Robert Giraldeau, Varennes; Guy St. Jean, Longueuil, all of Canada

[73] Assignee: Hydro Quebec, Montreal, Canada

[21] Appl. No.: 568,032

[22] Filed: Aug. 16, 1990

[51] Int. Cl.[5] .............................................. H02H 9/06

[52] U.S. Cl. .................................. 361/126; 361/127; 338/21

[58] Field of Search ................. 361/117, 126, 127, 56; 338/21

[56] References Cited

U.S. PATENT DOCUMENTS

| | | | |
|---|---|---|---|
| 4,218,721 | 8/1980 | Stetson | 361/127 |
| 4,335,417 | 6/1982 | Sakshaug et al. | 361/127 |
| 4,686,603 | 8/1987 | Mosele | 361/127 |
| 4,827,370 | 5/1989 | St-Jean et al. | 361/127 |

*Primary Examiner*—Todd E. Deboer
*Attorney, Agent, or Firm*—Foley & Lardner, Schwartz, Jeffery, Schwaab, Mack, Blumenthal & Evans

[57] ABSTRACT

Disclosed is a station or distribution surge arrester of the type comprising a single column of varistors stacked one upon the other and centrally arranged in a cylindrical chamber provided in a casing made of an insulating material. A plurality of movable props, made of a material which is both insulating and non-elastic, are used for holding the varistors in column form centrally in the chamber, even if the varistors break diametrically as is often the case during a severe thermal shock. By holding the varistors permanently at the center of the chamber, the props ensure the non-obstruction of several vertical passages around the column, which passages allow an arc created within the surge arrester to move freely toward a pressure limiting diaphragm during failure of the latter and, thereby, reduce explosion risks to a minimum. The props are advantageously secured over a base having a diameter greater than that of the varistors, by means of bolts or pins that are capable to shear at the least overheat or overpressure generated by the arc. The props are likewise preferably trapezoidal in cross-section and are arranged in such a way that the wide base of their trapezoidal cross-sectional come to rest against the periphery of the varistors, each wide base having a length such that the sum of all of the wide bases of all of the props be slightly shorter than the perimeter of the varistors.

8 Claims, 3 Drawing Sheets

SURGE ARRESTER

BACKGROUND OF THE INVENTION (a) Field of the Invention

The present invention relates to an improvement in the structure of surge arresters of the single column type, be they station or distribution surge arresters.

(b) Description of the Prior Art

Surge arresters are well known electric protection devices intended to be connected in parallel across an electric apparatus to be protected, in order to reduce overvoltages that can be produced between the terminals of the latter. More specifically, surge arresters are electric systems normally existing as an open circuit which transforms itself into a closed circuit in parallel with the apparatus to be protected as soon as a significant overtension appears between the terminals of the latter. It thus makes it possible to reduce the insulation level of electrical apparatuses which they protect and, consequently, their manufacturing cost.

Surge arresters presently available on the market are widely used in networks for the transmission and distribution of electrical energy (station and distribution surge arresters). These surge arresters usually comprise a porcelain casing having the general shape of a cylindrical tube sometimes closed at one end, which casing defines a chamber in which is placed one or several columns of disk-like varistors stacked one upon the other. It is well known that varistors are electrically active elements made of metal oxide such as zinc oxide, or yet silicium carbide of which the impedance varies non-linearly under the action of an overvoltage such as to provide an adequate protection.

As any electric devices, surge arresters are sometimes subject to failure. When such a failure occurs, one or several of the varistors become short-circuited permanently and an electric arc is formed within the casing which generates explosive overpressures as well as temperatures exceeding the melting point of all known metals. In order to reduce the risk of explosion of the surge arrester casing following an internal short-circuit, pressure limiting devices have been suggested, which are intented to transfer the electric arc to the outside by means of a diaphragm and of a nozzle which guide the hot gases generated by the overpressure. Obviously, these elements must be mounted on the porcelain casing which makes its construction relatively expensive. That is in fact why such elements are mostly found in surge arresters used in high voltage transmission stations.

In U.S. Pat. No. 4,827,370 issued on May 2, 1989 to the Applicant, a new type of cylindrical casing or envelope has been proposed to replace the porcelain casings used up to now for the construction of surge arresters. This new casing is advantageously made of a synthetic insulating material capable of withstanding a high mechanical stress, such as epoxy concrete or polymer concrete. This casing is moulded over a thin tube preferably made of glass, mounted on an electrode.

The solution proposed in this U.S. patent has the great advantage of eliminating any disadvantages related to the use of porcelain for the manufacturing of the casings and hence allowing making surge arresters for distribution networks that are much less exposed to explosion risks or to breaking of the casing and this at a cost which is comparable to that of existing distribution surge arresters made of porcelain.

It has however been noted that if, as indicated above, the solution proposed in this U.S. patent makes it possible to considerably reduce the risks of explosion, it does not totally eliminate this risk in the particular case where the surge arrester is subject to a severe thermal shock.

In order to understand this risk better as well as the solution proposed in the frame work of the present invention, it is appropriate to describe more in detail the basic structure of surge arresters of the single column type and the manner in which they react in the case of internal failure.

As mentioned previously, any single-column surge arrester comprises a casing made of an insulating material, such as porcelain or, as in the case of the above-mentioned U.S. Pat. No. 4,827,370, of an epoxy or polymer concrete; such a casing defining a generally cylindrical chamber having a wall and two ends of which at least one is not closed. In the case of surge arresters of the single-column type, the single column of varistors is arranged within the chamber. These varistors have the shape of cylindrical disks having a diameter smaller than that of the casing chamber, the disks being stacked one upon the other to form the single column. Means, usually constituted by a spring pressing on one of the bases of the column, serve to hold the disks in stacked up condition within the casing. Electric contacts or electrodes are provided at the two ends of the casing chamber to allow electrically mounting the column of varistors to the terminals of and across an electrical apparatus to be protected against overvoltages.

In order to allow for a transfer of the electric arc from the inside to the outside in case of failure of the surge arrester, a diaphragm is advantageously provided across each end of the chamber of the casing which is not closed. This diaphragm is made of a sheet of aluminum or of any other material that can tear easily under the action of an overpressure generated by an electric arc that can develop within the chamber in case of internal failure of the surge arrester, to thereby allow natural evacuation of the hot gases generated by the arc at each end of the casing which is not closed and, hence reduce the risks of explosion of the latter. Usually, a nozzle is also used upstream of the diaphragm for orienting outwardly the escaping hot gases as soon as the diaphragm is perforated.

Under normal operating conditions, current coming from the outer circuit to which the surge arrester is connected flows through the latter by passing from one contact to the other via the column of varistors.

In case of the failure of one or several of the varistors, disposed in column form within the casing, an electric arc is produced inside the chamber which creates an inner overpressure causing perforation of the diaphragm. As soon as the perforation is produced, the hot gases inside the casing may escape and are directed by the nozzle toward another electrode to thereby cause a transfer of the inner arc outwardly of the casing and, hence, free the inside of the latter from overpressures and temperatures that could cause an explosion.

In order that this safety mechanism may operate adequately, it is obviously necessary that the electric arc which is naturally created during the failure may expand inside the casing chamber and that this arc may reach the diaphragm without any obstruction in order to perforate it and thereby ensure relaxation of the hot gases necessary for the outward transfer of the arc. It is therefore essential that no mechanical blocking exists along the axis of the inner chamber of the casing, in the direction of the end of the latter which is not closed.

For this purpose, the usual practice has always been to use disk-like varistors having a diameter smaller than the inner diameter of the chamber to leave a ring of air sufficient around the disks to allow the arc to develop and reach the diaphragm, being understood that any obstruction to the passage of the arc reduces the possibility of the latter to be transferred to the outside and, hence, substantially increases the risks of explosion. Now, the possibility of such an obstruction exists in permanence in the case of fragmentation of the varistor disks, for thermal or purely mechanical reasons. It has thus been noted that, in the case of failure of one of the varistors, a substantial leakage current is generated which causes an important rise in the voltage and a severe thermal shock capable of bringing an almost diagrammatical fragmentation of certain of the disks of which the fragments then move to obstruct the annular passage provided around the column.

SUMMARY OF THE INVENTION

The object of the present invention is to provide a device of very simple structure, which is capable of resolving the problem mentioned above and from there reduce to a minimum the risks of explosion of the casing of a surge arrester in case of inner failure resulting from a lack sufficient space in the chamber to allow the arc generated during the failure to develop and reach the diaphragm.

More specifically, the invention proposes a device for use to hold the varistors disks piled up in a single column in the casing chamber, which device consists of at least three and preferably four props made of material which is both insulating and non elastic, such as porcelain, ceramic, epoxy concrete or polymer concrete. In order to ensure their disk-holding function, each of the props extends over the full height of the column and are symmetrically spread about it.

With such particular arrangement and disposition, the props form and permanently hold free passages in a number equal to their own number and this all around the varistor column. Each of these passages is of course and in practice constituted by the air space defined between two props, the wall of the column and the wall of the chamber.

As previously indicated, the main purpose of these props is to hold, in case of the fragmentation of one or several of the disks following a severe thermal shock, the fragmented pieces of varistors at the center of the chamber. The props thus guaranty that the passages which they create along the column will not be obstructed and, from there, guaranty the expansion of the arc that can take place anywhere about the column and guaranty its development without any obstruction. The props also ensure canalizing the shock wave and the hot gases toward the diaphragm without any risk of obstruction and consequently of explosion.

Preferably, each prop has a cross-section in the form of an isosceles trapezium and is arranged in such a way that the wide base of its trapezoidal cross-section comes to bear against the periphery of the disks. This trapezoidal shape is interesting in the sense that it makes it possible to maximize the free space inside the casing chamber and consequently enlarge to a maximum the passages in which the failure arc can expand.

In order to ensure that the pieces of varistor disks are held in position when disk breakage occurs, wide base of each trapezoidal prop is concave and has the same curvature as that of the periphery of the disks. Besides, this wide base has a length such that the sum of all of the wide bases of all the props is slightly smaller than the perimeter of the disks. In other words, the bases of the props are selected in such a way as to surround almost continuously the circumference of the disks to avoid that even the small fragments may obturate the passages defined between the props for allowing the arc to spread.

According to a preferred embodiment of the invention, the props are mounted by means of securing rods that can easily be sheared by mere overheat or overpressure, all around the periphery of a rigid base having a diameter greater than that of the disks; this base being intended to be located beneath the column of varistors. This particular assembly has the great advantage to provide sufficient flexibility to the props to allow expansion of the art generated in case of failure of the surge arrester, which arc is never rectilinear. As can indeed be understood, the arc developing during failure of the surge arrester will find itself enclosed within an axial segment defined by two of the props. The latter being held only at one end to the base, they can easily spread out at the other end which is preferably that where the diaphragm is located whereby the arc is given a larger passage. Besides, by being held to their base by means of easily shearable rods, the props may be completely freed as soon as the arc is formed and, under the arc pressure, be pushed so as to give the axial segment into which the arc is formed, its maximum width.

As indicated previously, the invention is especially designed for use with surge arresters of the single column type, since the use of such a set of props offers an advantage only where the surge arrester contains a single column of varistors. On the other hand, the present invention is not limited to a particular type of surge arresters and may be used indifferently with surge arresters for stations and surge arresters for distribution.

It appears also appropriate to mention that the props, of which the use is proposed within the framework of the present invention, must not be confused with the heat-carrying mechanical supports sometimes used to create a thermal bridge between the inner wall of the casing chamber and the outer wall of the varistors for facilitating cooling of the latter. Indeed, the heat-carrying mechanical supports thus used are usually made of rubber in which heat-carrying additives have been incorporated. Contrary to the props of the present invention, these supports are made of elastic material so as to allow them to be squeezed inside the chamber and thus provide a permanent and very narrow contact between the wall of the varistors and the wall of the chamber. At the opposite, the props used according to the invention must be made of non-elastic or rigid material in order to be able to move without flexing or being deformed under the pressure of an arc developing in one of the passages.

In the case of heat-carrying mechanical supports, it is also necessary that they have a maximum of contact with the wall of the chamber since the essential purpose of these supports is to provide a transfer of heat from the varistors to the outside. To the contrary, the props according to the invention preferably have the shape of a trapezium of which the narrow base faces the wall of the housing in order to provide a maximum of free space near the said wall. Besides and according to the invention, contact between the props and the chamber wall must be reduced to a minimum in order for the props to be moved easily when an arc is formed.

It is thus obvious that one cannot confuse, as well from the point of view of use than from the point of view of structure, the heat-carrying mechanical supports presently existing with the props proposed by the present invention and having a very particular structure and use.

Finally, it is of course evident that the use of the present invention must in no way be restricted to the surge arrester casing which is the object of the U.S. patent mentioned above. In fact, as can easily be understood, the improvement according to the present invention may be used with any type of existing surge arresters provided with a casing made of porcelain or any other equivalent material.

BRIEF DESCRIPTION OF THE DRAWINGS

The invention will be better understood from the non-limitative description that follows of a preferred embodiment of the latter having reference to the appended drawing wherein.

DESCRIPTION OF A PREFERRED EMBODIMENT

Figure 1:
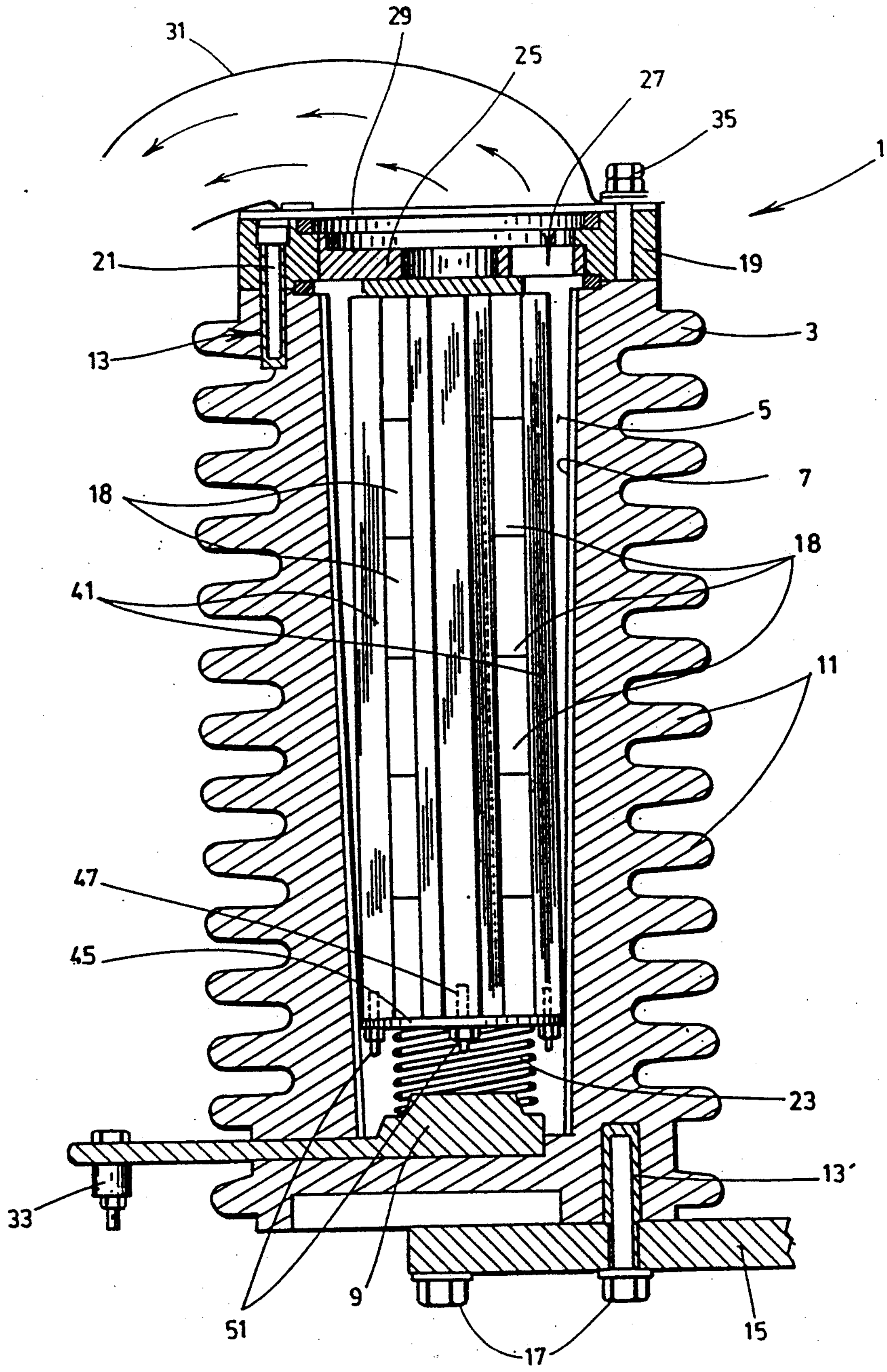
FIG. 1 is a vertical cross-sectional view of a surge arrester such as described in U.S. Pat. No. 4,827,370, provided with the improvement of the present invention.

The surge arrester of the single-column type illustrated in FIG. 1 of the appended drawing is described in detail in U.S. Pat. No. 4,827,370 issued on May 2, 1989 to the present Applicant, HYDRO QUEBEC. Consequently, only the parts of the surge arrester essential for the understanding of the present invention are hereinafter described.

The surge arrester 1 comprises an outer casing 3 made of an electrically insulating material. This casing defines a generally cylindrical chamber 5 provided with a wall 7 and two ends of which at least one is closed by an electrode 9 acting as a first electric contact.

The outer surface of the casing 3 is preferably provided with annular fins 11 serving, on the one hand, to provide the casing with a dielectric capacity under rain and pollution conditions and, on the other hand, to increase its mechanical resistance. The casing 3 is also provided with a plurality of anchors 13 and 13'. Anchors 13', which are located at the end of the casing where the cavity is closed by the electrode 9 serve for securing the surge arrester directly on a support 13 by means of bolts 17. Anchors 13 provided at the other end of the casing where the end of the housing is not closed, serve essentially to secure a cover 19 by means of bolts 21.

The surge arrester 1 comprises a column of varistors 18 each having the shape of a cylindrical disk and a diameter smaller than that of the chamber 5. The varistors 18 are stacked one upon the other to form a single column provided at the very center of the chamber 5. Means comprising a spring 23 are mounted between the electrode 9 and the base of the column of varistors 18 to hold the latter against the cover 19.

The latter has an annular shape and is made of an electrically conductive material whereby to form the other contact or electrode of the surge arrester, at the other end of the varistor column 20. This cover 19 is, for assembling reasons, made up of several parts of which, namely, a centering part 25 for holding the column of varistors. This part 25 is itself provided with a plurality of peripheral passages 27 the purpose of which is essentially to allow the escape of hot gases when comes an overpressure in the chamber 5 within the casing 3.

A diaphragm 29 is mounted on the cover 19 to close the latter. The diaphragm 29 is usually made from a thin sheet of metal capable of tearing when subjected to an overpressure generated by the shock wave and the gases of an electric arc developing within the chamber 5 during an inner failure of the surge arrester.

Finally, the surge arrester 1 comprises a hot gases-evacuating nozzle 31, made solid with the cover 19, serving to orient hot gases toward an explosive bolt 33 connected to the electrode 9; the hot gases having escaped through the apertures 27 following perforation of the diaphragm 29. On the one hand and in case of failure, this ensures transfer on the outside of an arc formed on the inside and, following the transfer, explosion of the bolt 33 to isolate the surge arrester from the ground when the failure current is interrupted by the circuit breaker provided for this purpose in the electric distribution network.

The surge arrester 1 previously described is mounted on the terminals of and in parallel across an apparatus to be protected, by joining the electrode 9 (usually through an explosive bolt 33) one of the terminals of the apparatus and by joining the cover 19 through a bolt 35 to another terminal of the same apparatus. The other structural details as well as the operation of the previously described surge arrester are known per se and described in detail in the copending Canadian patent application No. 526,130.

According to the present invention, the surge arrester 1 above described is improved in that the means used for holding the varistor disks 20 stacked into a column in the chamber 5 of the casing 3 include, besides the spring 23, at least three and preferably four props 41 made of a material which is both insulating and non elastic. Props 41, which are preferably rods made of porcelain, ceramic or any other synthetic insulating material such as polymer concrete or epoxy concrete, extend over the full height of the column of varistors 18. The same props 41 are also symmetrically disposed about the column of varistors 18 to surround the latter almost entirely.

As has been explained in detail in the preamble to the present specification, the essential purpose of these props is to define and retain, all around the column, passages 43 equal in number to the number of props, each passage being circumsribed by the outer periphery of the varistors 18, the lateral walls of two adjacent props and the inner wall 7 of the chamber 5.

The means for holding the stacked disks in column form within the casing chamber also include, in the embodiment illustrated, a rigid base 45 preferably constituted by a round metal plate of which the diameter is greater than that of the disks. The base 45, which serves for the mounting of the props 41, is advantageously located beneath the column in contact with the spring 23. It is therefore this base 45 which is contact with the spring 23 and which ensures the transmission of the electric current between the electrode 9 and the first of the varistors 18.

The props 41 are secured by their lower ends to this very base by means of small securing rods constituted by bolts 47 secured to them, each bolt passing through a hole 49 provided for this purpose through the base 45 before being held to it by means of a nut 51.

Advantageously, the bolts 47 are selected from a material capable of easily melting or shearing in the case of overheating so as to free immediately the lower ends of the props 41. Bolts 47 may thus be made of NYLON or any other appropriate material.

Figure 2:
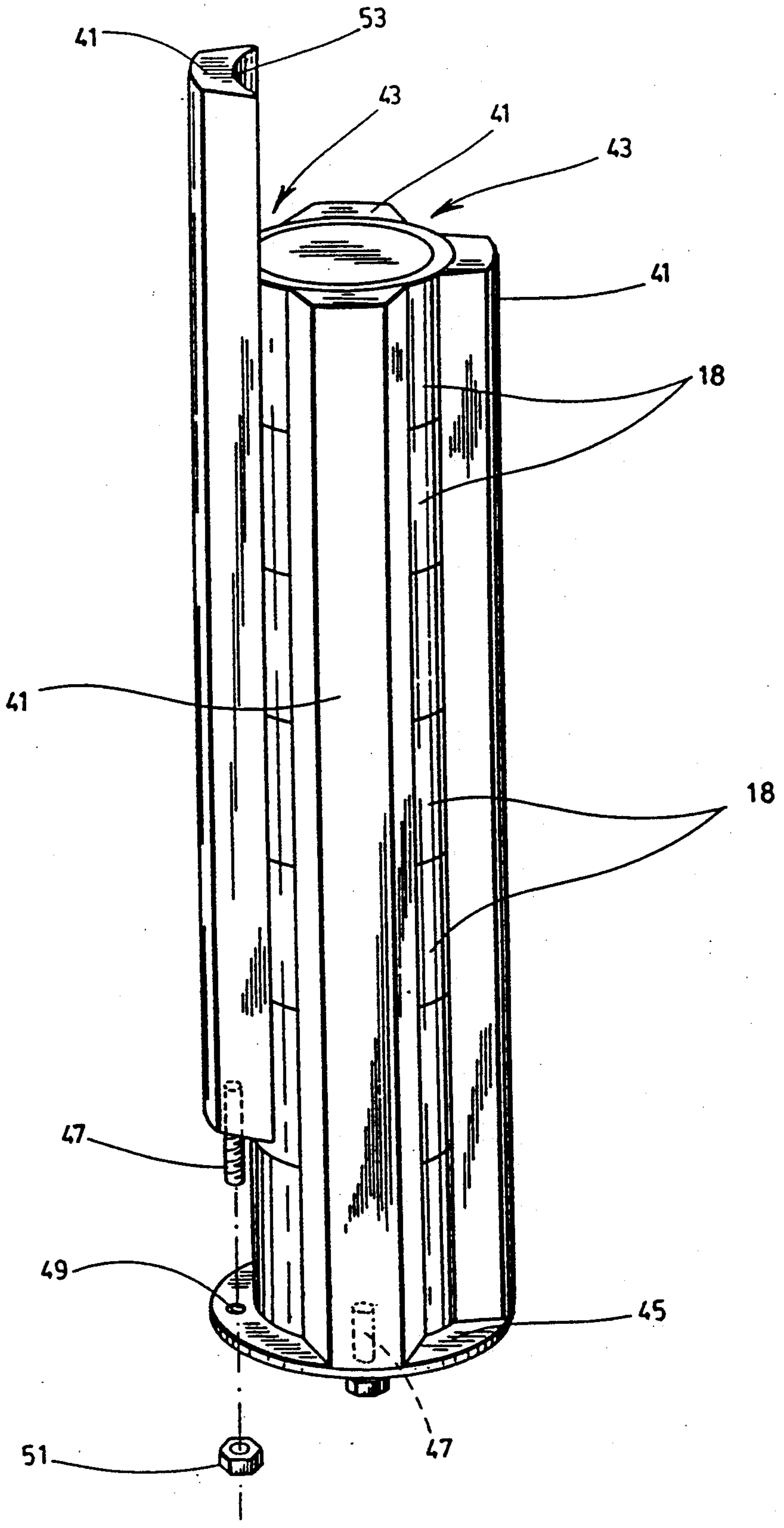
FIG. 2 is a perspective view of a column of varistors surrounded by a set of props according to the invention, mounted on a base.
Figure 3:
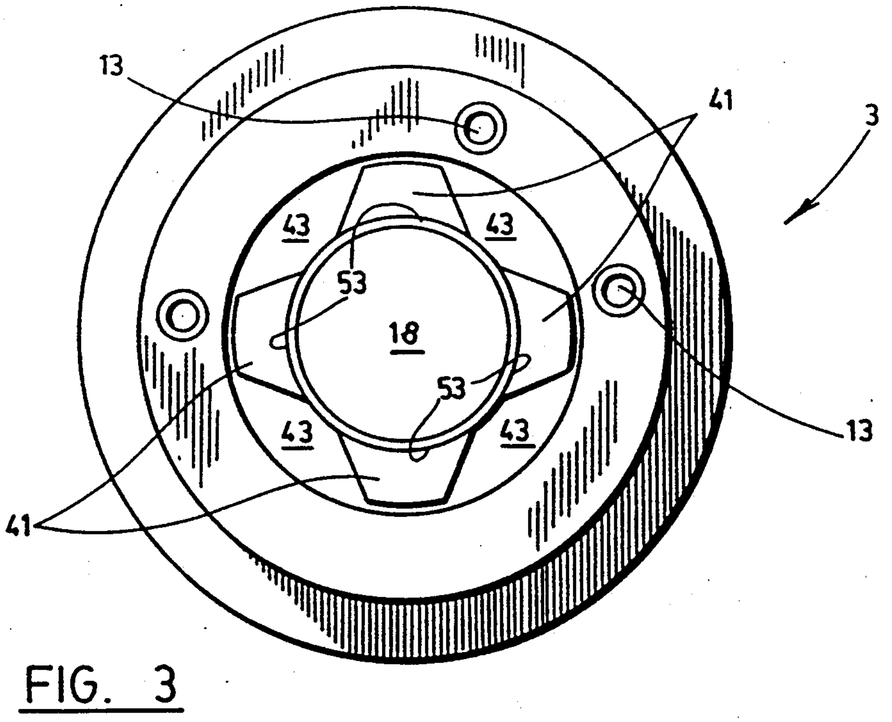
FIG. 3 is an end view of the non-closed end of the surge arrester illustrated in FIG. 1.

As clearly illustrated in FIGS. 2 and 3, each prop 41 has a cross-section generally in the form of an isosceles trapezium disposed in such a way that its wide base 53 comes to bear against the periphery of the varistor disks 18. This wide base is concave and has the same curvature as that of the periphery of the varistors 18. It further has a length such that the sum-total of the length of all the wide bases of the props surrounding the column be slightly smaller than the perimeter of the disks so as to surround the periphery of the latter almost continuously and thereby retain any fragment which can be formed when one or several of the varistors 18 break.

This cross-section in the form of an isosceles trapezium is very advantageous insofar as it makes it possible to obtain perfect encircling of the varistor disks 18 while simultaneously increasing the free space defined by the passages 43 to a maximum.

Figure 4:
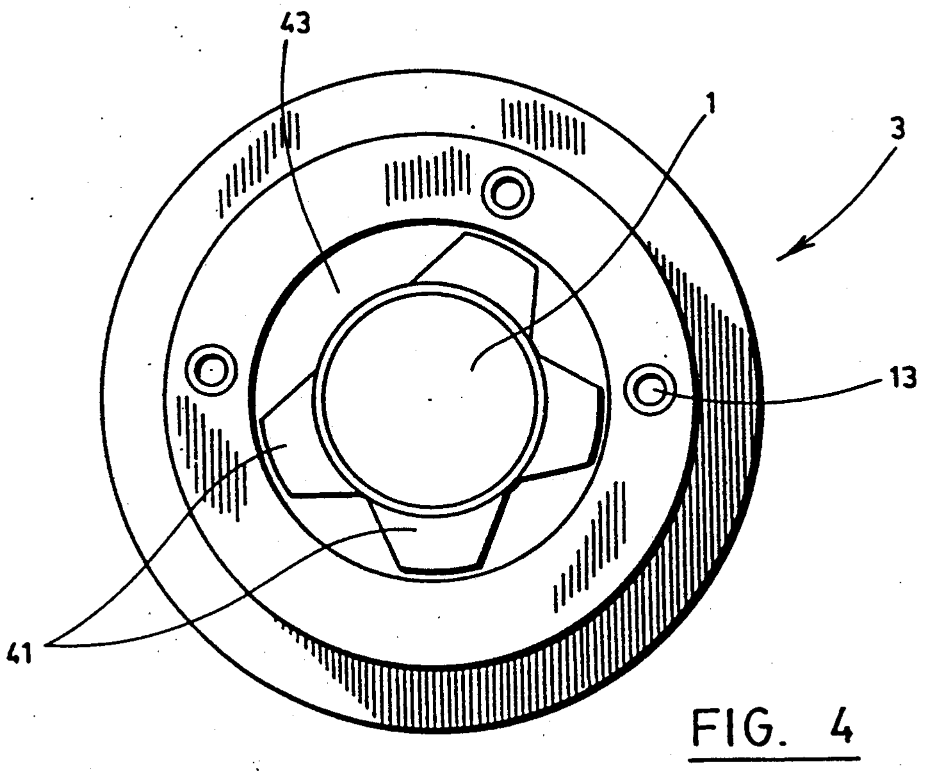
FIG. 4 is a view identical to that of FIG. 3, illustrating the position of the props following a severe thermal shock having caused a diametrical fragmentation of the disks and the formation of an electric arc within the chamber.

As has been indicated above, the main use of the props 41 is to hold, at the center of the chamber 5, fragments of varistors that could be formed when they break following a severe thermal shock. At the occurrence of such a failure, one or several of the varistors will break diametrically as illustrated in FIG. 4 and cause the formation of an arc within the chamber 5. Of course, this arc will form and spread inside one of the passages 43 and driven toward the cover 19 by adjacent props 41 so as to tear the diaphragm and ensure the ejection of hot gases in the nozzle 31.

Due to the props of which the wide bases surround the circumference of the column almost continuously, no fragment is likely to enter into the space 43 in which the arc is formed. Consequently, the risks of obstructing the passage are almost eliminated which at the same time, reduces to a maximum the risks of explosion in the casing 3.

As soon as the arc is formed, the heat generated and the shock wave will cause the bolts 47 to shear and hence free the props completely from the base 45 and allow them to become movable. The two props bording the passage 43 in which the arc takes place can then slide in opposite directions under the effect of the arc. This spreading action will allow opening the passage 43 to a maximum and allow expansion of the arc without any constraint.

It is appropriate to mention that tests have been carried out within the scope of a new standard established by the corporation HYDRO QUEBEC, namely standard B-31.19-03 of 1988. These tests which have been carried out on surge arresters of the type described in U.S. Pat. No. 4,827,370 with movable props made of polymer concrete were found to be extremely positive.

We claim:

1. In a surge arrester of the single column type, comprising:

- a casing made of insulating material and having an inner wall defining a generally cylindrical chamber having two ends of which at least one is an open end;
- a single column of varistors disposed inside said chamber, said varistors having the shape of cylindrical disks of a diameter smaller than that of said casing chamber, said disks being stacked one upon the other thereby to form said single column;
- means for holding said stacked disks in column form in said casing, and
- electric contacts at said two ends of said casing chamber for allowing electrically mounting said column of varistors on terminals of and in parallel across an electric apparatus to be protected against overvoltages, the improvement wherein:

- said disk-holding means include at least three props made of a material which is both insulating and non-elastic; each of said props extending over the full height of said column and being symmetrically arranged therearound to form and hold, all around the said column, rectilinear passages equal in number to the number of props, in case of disk breaking resulting from a severe thermal shock due to an internal failure of the surge arrester; the said passages defined between said inner wall of said casing, said props and said column, allowing any inner electric arc occurring during said internal failure to spread within said chamber and allowing hot gases generated by said arc to exhaust through said open end of said casing thereby reducing risks of explosion of said casing.

2. The improved surge arrester of claim 1, wherein said disk-holding means further include a rigid base provided at one end of said column and over which said props are mounted; said mounting ensuring by itself holding of said props in position around said column.

3. The improved surge arrester of claim 2, wherein said base has a diameter greater than that of said disks and said props are fixed by one end thereof to said base by securing rods capable of easily shearing under the least overpressure or overheat.

4. The improved surge arrester of claim 3, wherein said rods are nylon bolts.

5. The improved surge arrester of claim 1, wherein said props are made of a material selected from porcelains, ceramics and rigid synthetic insulating materials of the epoxy-concrete and polymer-concrete type.

6. The improved surge arrester of claim 1, wherein each prop has a cross-section in the shape of an isosceles trapezium and is disposed so that the wide base thereof comes to bear against the periphery of said disks; said wide base being concave and having the same curvature as that of said periphery.

7. The improved surge arrester of claim 6, wherein said wide base has a length such that the sum of all wide bases of all of said props is slightly shorter than the perimeter of said disks.

8. The improved surge arrester of claim 1, wherein:

- there are four props, each one having a cross-section in the shape of an isosceles trapezium;
- said props are disposed in such a way that the wide bases of their trapezoidal cross-section come to bear against the periphery of said disks; said wide bases being concave and of the same curvature as the said periphery and having a length such that the sum of all wide bases of all props is slightly shorter than the perimeter of said disks;

said disk-holding means further include a spring mounted between one of said electric contacts and said column of varistors;

said surge arrester further comprises a protection diaphragm mounted across said open end of said casing chamber, said diaphragm being made of a material that can tear easily by overpressure within said chamber whereby to allow escape of hot gases generated by an electric arc during a failure caused by lightning;

said surge arrester also comprises a nozzle provided above said open end of said casing for guiding escaping hot gases in case of internal failure and of tearing of said diaphragm.

* * * * *